United States Patent [19]

Keohan

[11] Patent Number: 5,155,198

[45] Date of Patent: Oct. 13, 1992

[54] PRIMER COMPOSITION CONTAINING EPOXY PHOSPHATE ESTERS, SILANE COUPLING AGENT, REACTIVE END GROUP-TERMINATED POLYDIORGANOSILOXANE, ORGANOMETALLIC CATALYSTS AND AMINE HARDENING AGENTS

[75] Inventor: Francis L. Keohan, Plymouth, Mass.

[73] Assignee: Cape Cod Research, Falmouth, Mass.

[21] Appl. No.: 714,980

[22] Filed: Jun. 14, 1991

Related U.S. Application Data

[63] Continuation-in-part of Ser. No. 342,107, Apr. 24, 1989, abandoned.

[51] Int. Cl.$^5$ .................... C08G 77/04; C08G 59/02
[52] U.S. Cl. ........................ 528/15; 528/14; 528/17; 528/18; 528/28; 528/99; 528/398
[58] Field of Search .................... 528/27, 99, 398, 15, 528/14, 17, 18, 28

[56] References Cited

U.S. PATENT DOCUMENTS

| | | | |
|---|---|---|---|
| 3,558,668 | 1/1971 | Hochreuter et al. | 528/398 |
| 3,664,974 | 5/1972 | Cohen et al. | 528/398 |
| 4,543,404 | 9/1985 | Sugano et al. | 528/26 |
| 4,613,661 | 9/1986 | Langer et al. | 528/108 |

FOREIGN PATENT DOCUMENTS 709642 1/1980 U.S.S.R. .

*Primary Examiner*—John C. Bleutge
*Assistant Examiner*—R. Dean, Jr.

[57] ABSTRACT

A primer composition which contains a diluent and a film forming binder wherein the film forming binder contains a siloxane condensation catalyst, an amine hardner, a silane coupling agent and the reaction product of a polydiorganosiloxane having a reactive end group and an epoxy functional phosphate ester compound. The composition is useable as a primer on aluminum substrate.

7 Claims, No Drawings

PRIMER COMPOSITION CONTAINING EPOXY PHOSPHATE ESTERS, SILANE COUPLING AGENT, REACTIVE END GROUP-TERMINATED POLYDIORGANOSILOXANE, ORGANOMETALLIC CATALYSTS AND AMINE HARDENING AGENTS

This invention was made with Government support under Contract No. F33615-88-C-5460 awarded by the Department of Defense. The Government has certain rights in this invention.

This application is a continuation-in-part of application Ser. No. 342,107 filed on Apr. 24, 1989, which is now abandoned.

BACKGROUND OF THE INVENTION

The present invention relates to a primer composition, and in particular, to a unique primer composition for an aluminum substrate. The primer composition has excellent adhesion to an aluminum substrate and has outstanding resistance to elevated temperature and high humidity conditions.

Epoxy adhesives have been widely used in the aircraft industry to bond together aluminum parts. However, failures of these bonds have occurred within hours under conditions of high stress and elevated temperature and high humidity, for example 50° C. and 95% R.H. and a shear stress equal to about 30% of the original ultimate strength of the bond. To reduce these adhesive bond failures, the aluminum has in the past been coated with a corrosion inhibiting primer containing hexavalent chromium. Chromates provide the best adhesion heretofore available by inhibiting surface metal corrosion by retarding the anodic electrochemical reaction of aluminum with water. Said primers offer superior durability and resistance to hostile environments over primers using other anodic corrosion inhibitors such as permanganates and silicates.

While chromate corrosion inhibitors perform quite well, they are both toxic to man and the environment. The novel primer composition of this invention contains no toxic materials and yet has mechanical performance similar to that of chromate based primers. It is believed to derive its surprising effectiveness from the hydrophobic nature of silicone polymers and from the inherent strength of aluminum-phosphate bonds. The novel primer composition of this invention has excellent adhesion to aluminum substrates and provides a surface to which the epoxy adhesive will adhere and the primer does not fail when subjected to stress and elevated temperature and high humidity conditions. Combining these desirable features with a formulation which is not toxic to man and the environment represents a substantial improvement over prior art formulations.

SUMMARY OF THE INVENTION

The novel primer composition of this invention comprises 1–30% by weight, based on the weight of the primer composition, of a film-forming binder composition dissolved in an organic solvent, wherein the binder composition consists essentially of 0.01–20% by weight, based on the weight of the binder, of a reactive endgroup-functional polydiorganosiloxane is used. The polysiloxane has the following formula

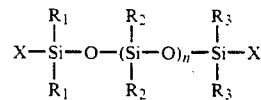

where n is an integer equal to 0 to 2,000 inclusive; X is selected from the group consisting of halogen, hydrogen, —OH, —OOCR$_3$, —OR$_3$, and —NHR$_3$, —N(R$_3$)$_2$, —O—N=R$_3$, and —SR$_3$. "R$_1$ is selected from a group consisting of C$_{(1-13)}$ monovalent hydrocarbon radicals, substituted derivatives thereof which are free of olefinic unsaturation, and C$_{(2-10)}$ olefinically unsaturated radicals;". R$_2$ is selected from the class consisting of C$_{(1-18)}$ hydrocarbon radicals and substituted derivatives thereof; and R$_3$ is selected from the class consisting of a hydrocarbon radical and a substituted hydrocarbon radical;

50–95% by weight, based on the weight of the binder composition, of an epoxy phosphate ester. Preferred phosphate esters of the present invention are represented generally by the formula:

$$\begin{array}{c} O \\ \| \\ R''-O-P-O-R' \\ | \\ O \\ | \\ R''' \end{array}$$

wherein R' is a glycidyl ether of the general formula:

$$\mathrm{+CH_2-CH-CH_2-O-R-O\!\!\rightarrow_{\!m}\!\!CH_2-CH\!\!-\!\!-\!\!CH_2} \atop \overset{|}{\mathrm{OH}} \qquad\qquad\qquad \underset{O}{\diagdown\!\!\diagup}$$

wherein m is a positive number less than about 20 and is equal to the number of repeating units in the compound; R is an aromatic group or a remnant of a compound which contains an aromatic group; R" is H or an organic group of up to about 20 carbons; and R''' is a group as defined by R' and R".

0.01–25% by weight, based on the weight of the binder composition, of a silane coupling agent;

5–30% by weight, based on the weight of the binder composition, of an amine hardener comprising an aliphatic, aromatic, or cycloaliphatic amine, or epoxy-modified amine adduct; and 0.1–2% by weight, based on the weight of the polydiorganosiloxane, of a organometallic catalyst selected from the alkoxy and 2,4-pentanedione derivatives and organic acid salts of titanium, zirconium, tin and zinc.

DESCRIPTION OF THE INVENTION

The novel primer composition of this invention has a film-forming binder content of 1–30% by weight, and preferably, 5–15% by weight. The composition is prepared by blending the ingredients together in a suitable solvent to form the composition utilizing standard blending procedures.

The novel primer composition contains 0.01–20% by weight, based on the weight of the binder, of a reactive endgroup-functional polydiorganosiloxane. The polysiloxane resin has the following formula

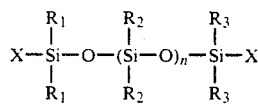

where n is an integer equal to 0 to 2,000 inclusive; X is selected from the group consisting of halogen, hydrogen, —OH, —OOCR$_3$, —OR$_3$, and —N(R$_3$), —N(R$_3$)$_2$, O—N=R$_3$, and —SR$_3$. R$_1$ is selected from a group consisting of C$_{(1-13)}$ monovalent hydrocarbon radicals, substituted derivatives thereof which are free of olefinic unsaturation, and C$_{(2-10)}$ olefinically unsaturated radicals; selected from C$_{(1-13)}$ monovalent hydrocarbon radicals and is preferably a mixture of monovalent hydrocarbon or substituted derivatives thereof which are free of olefinic unsaturation and C$_{(2-10)}$ olefinically unsaturated aliphatic radicals; R$_2$ is selected from the class consisting of C$_{(1-18)}$ hydrocarbon radicals and substituted derivatives thereof; and R$_3$ is selected from the class consisting of a hydrocarbon radical and a substituted hydrocarbon radical;. Examples of suitable R$_2$ radicals are alkyl radicals, such as the methyl radical, ethyl, n-propyl, isopropyl, n-butyl and sec-butyl radical, as well as octyl, dodecyl and octadecyl radicals; alkenyl radicals such as vinyl and allyl radicals; aryl radicals such as the phenyl radical; alkaryl radicals such as the tolyl radical; and aralkyl radicals such as the benzyl radical. Examples of halogenated hydrocarbon radicals having from 1-18 carbon atoms are the 3,3,3-trifluoropropyl radical and the o-, p- and m-chlorophenyl radicals. Because they are readily available, it is preferred that at least 50 percent of the number of SiC-bonded organic radicals in the diorganopolysiloxanes be methyl radicals. Mixtures of diorganopolysiloxanes having different substituents and different degrees of substitution can be employed.

Preferably, 1-5% by weight of this end group-reactive polydiorganosiloxane based on the weight of the binder composition is used wherein n is 5-100 and X is —OH, —OCH$_3$, or —OCH$_2$CH$_3$.

The novel primer composition contains 50-95% by weight, based on the weight of the binder in the composition, of an epoxy phosphate ester. Preferred phosphate esters of the present invention are represented by the formula

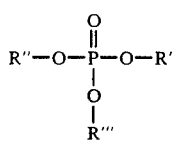

wherein R' is a glycidyl ether of the general formula

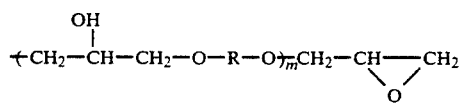

wherein m is a positive number less than about 20 and is equal to the number of repeating units in the compound; R is a difunctional remnant of a dihydroxy compound formed by the removal of the hydroxyl groups thereof; R'' is a group as defined by R''' or R'; R''' is H or an organic group of up to about 20 carbons.

Preferably 70-90% by weight of this resin is used wherein m is 0-2.

The novel primer composition contains about 0.01% to 25% by weight, based on the weight of the binder composition, preferably 0.5-5% by weight of a silane coupling agent of the general formula R-Si-(OR)$_3$ having 1-20 carbon atoms in the alkyl group. Typical silane coupling agents are as follows: epoxycyclohexylalkyltrialkoxy silane, such as beta-(3,4-epoxycyclohexyl)-ethyltrimethoxy silane, glycidoxyalkyltrialkoxy silane, such as gamma-glycidoxypropyltrimethoxy silane, mercaptoalkyltrialkoxysilane, such as mercaptopropyltrimethoxy silane, aminoalkyltrialkoxysilane, such as gamma-aminopropyltriethoxy silane and gamma-aminopropyltrimethoxy silane, and (aminoalkyl)-aminoalkyltrialkoxy silane, such as N-beta-(aminoethyl)-gamma-aminopropyltrimethoxy silane.

The novel primer composition contains 5-30% by weight, based on the weight of the binder composition, preferably 10-20% by weight of an amine hardener comprising an aliphatic, aromatic, or cycloaliphatic amine, or epoxy-modified amine adduct. The amine hardener is used to crosslink the epoxy resin at or slightly above room temperature.

The novel primer composition contains 0.1-2% by weight, based on the weight of the polydiorganosiloxane, preferably 0.5-1.5% by weight of an organometallic catalyst selected from the alkoxy and 2,4-pentanedione derivatives and organic acid salts of titanium, zirconium, tin and zinc. The organometallic compounds catalyze the condensation of alkoxy silanes and silanol-terminated polydiorganosiloxanes and are used to crosslink the siloxane resins in the primer compositions. Typical organometallic catalysts include but are not limited to compounds of the general structure: M(OR)$_4$ where M is titanium or zirconium and R is ethyl, n-propyl, isopropyl, butyl pentyl, octyl, or 2,4-pentanedione or M'(OR)$_2$ where M' is tin or zinc. Typical metal salts which are known condensation catalysts include but are not limited to carboxylates of zinc, iron, and tin such as dibutyltindilaurate, tin octoate, tin naphthenate, iron octoate, zinc octoate and zinc naphthenate. Preferred catalysts are tetraalkoxy derivatives of titanium and zirconium having 1-20 carbons in the alkoxy groups.

The invention is illustrated in the examples which follow.

EXAMPLE 1

The following ingredients are blended together to form a 10 percent solids solution of the primer:

| Parts by weight | |
|---|---|
| Silanol-terminated polydimethylsiloxane resin (having an average degree of polymerization between 5 and 10 and viscosity in the range of 15-35 centistokes) | 0.5 |
| Phosphate-modified bisphenol A polyepoxide resin (having an epoxide equivalent of 300 and a phosphorus content of from 0.5 to 2.5 percent by weight). | 7.9 |
| Amine-functional epoxy-amine adduct hardener (having a reactive hydrogen equivalent of 50 to 55). | 1.2 |
| Gamma-aminopropyltriethoxy silane | 0.4 |
| Dichloromethane | 90.0 |
| Total | 100.0 |

After the above ingredients are thoroughly blended together, the mixture is catalyzed by the addition of 1 percent by weight of titanium (IV) butoxide based on the weight of the polysiloxane resin. The catalyzed primer solution is stirred at room temperature to dissolve the primer before spraying over suitably prepared adherend surfaces. The composition is stable for 24 hours in the presence of solvent. When the solvent flashes off, the mixture will cure at room temperature.

The aluminum panels to be primed are prepared for spraying as follows:

(1) Wipe with methylene chloride by dust-free towels.

(2) Etch at room temperature (70° F.) in an alkali-silicate solution consisting of 19% sodium metasilicate, 1% sodium hydroxide, 1% phosphate detergent, and 79% deionized water for minutes.

(3) Rinse with deionized water and etch at 60° C. in a chromic acid solution consisting of 2% sodium dichromate, 24% concentrated sulfuric acid and 73% deionized water for 12 minutes.

(4) Thoroughly rinse in deionized water and dry in an air circulating oven at 60° C. for 2 hours. Allow panels to cool to room temperature before priming.

The primer formulation is then sprayed over the above-prepared panels using a conventional air sprayer. The number of passes is varied to obtain a desired 0.1-0.6 mil film thickness. The panels are dried at room temperature (25° C.) for a minimum of one hour.

Suitably primed lap shear test coupons and wedge test panels are adhesively bonded with a commercial supported film adhesive. An adhesive which forms highly durable bonds in combination with the above primer composition consists of a nitrile rubber-modified, one-part epoxy adhesive film on a polyester mat and is designed for structural bonding applications. The grade used for this study has a nominal thickness of 0.011 in. and is stored in a freezer kept below 0° F. Before applying, the adhesive is allowed to warm to room temperature.

Lap shear specimens are prepared individually from aluminum coupons having dimensions 4×1×0.062 in. The primed coupons are adhesively bonded by fixing a 1×0.5 in. piece of film adhesive at the end of one coupon and placing the other on top. Two more coupons and 0.01 in thick Teflon film spacers are placed on either side of the specimen to give a level structure and maintain the bond line thickness during cure. The specimen assemblies are placed between the platens of a heated Carver Laboratory Press. A pressure of 50 psi is maintained during the adhesive cure cycle which consists of 60 minutes of heating from room temperature to 225° F. followed by 90 minutes at 225° F. After cooling, the assemblies are taken apart to yield the lap shear joints. Any adhesive which flows to the outer edges of the joints is removed before testing.

The lap shear tests were performed at room temperature on a Tinius Olsen Super "L" Universal Testing Machine. The specimens were pulled at a constant strain rate until bond rupture occurred. The adhesive bond areas of the failed specimens were examined to determine the mode of failure. Results were reported as average lap shear strength in lbs/in.$^2$ Wedge test specimens were generally prepared from two pretreated and primed aluminum plates with initial dimensions 6"×6"×0.125". A sheet of film adhesive with dimensions 6"×5" would be placed over one aluminum plate, leaving at one end an uncovered area measuring 1"×6". A 0.01"×1"×8" piece of Teflon film would be placed over the end space and the other plate would be placed on top. The adhesive was cured by heating under pressure as described above for the lap shear specimen assembly. After cooling, the Teflon spacer was removed, the sandwich assembly marked off into five, 1"-wide specimens and the piece cut with a bandsaw into five, 1"×6" wedge test specimens. The two, 0.5"-wide end pieces were also cut off and discarded.

The following comparisons are made between the novel primer composition of this invention and the commercially available, chromate-filled primer compositions to determine the strength and durability of the adhesive bond.

Wedge tests were performed by immersing wedge specimens in water at room and elevated temperatures. Stainless steel wedges were fabricated according to the dimensions specified in ASTM D3762. The tests were typically performed by inserting wedges in the open end of the specimens and driving them in with hammer blows until the ends of the wedges were flush with the ends of the specimens. The wedge specimens would then be allowed to sit at room temperature for one hour before measuring the initial crack length. The crack tip was located using a binocular microscope and its position marked with a scribe. The initial crack length was taken as the distance between the point on the wedge where the tapering begins to the crack tip. Individual sets of wedge specimens were normally placed in polyethylene containers filled with deionized water. These were covered and placed in a thermostatically controlled heating bath maintained at 25°±1° C. Sets of specimens were segregated from others that had been prepared by different methods to prevent possible cross contamination during immersion. The specimens were removed periodically to measure crack growth progression.

TABLE I

| Primer | Aluminum Alloy | Crack Length (in)* (168 hours immersion) (25° C.) |
|---|---|---|
| Example | 2024-T3 | 0.03 ± 0.03 |
| Example | 7075-T6 | 0.04 ± 0.04 |
| Comparison** | 2024-T3 | 0.01 ± 0.02 |
| Comparison** | 7075-T6 | 0.07 ± 0.04 |

*Average of five specimens
**Chromate-filled, modified epoxy phenolic primer applied by spray to a 0.1-0.5 mil film thickness, air dried at 25° C. for 30 min and oven cured at 250° C. for 30 min.

The above results show that adhesive bonds fabricated using primer compositions of the present invention exhibit equivalent or enhanced bond durability to bonds prepared with primer compositions of the prior art.

EXAMPLE 2

The same primer composition described in Example 1 was tested on aluminum adherends prepared by an alternative pre-prime surface treatment developed by the Air Force. After wiping with a dust-free cloth saturated with dichloromethane, substrates are wetsanded with a 1% solution of gamma-glycidoxypropyltrimethoxy silane in water. The gamma-glycidoxypropyltrimethoxy silane is allowed to hydrolyze in solution for one hour at room temperature before wetsanding. A fine grade of emery cloth is preferred. After sanding, the surfaces are cleaned free of abrasive by wiping with a cloth saturated with the wetsanding solution. The treated adherends are dried in an air circulating oven at 60° C. for two hours and cooled to room temperature before priming.

The treated adherends were primed and used to prepare lap shear and wedge test specimens using the procedures described in Example 1. The following comparisons are made between the novel primer composition of this invention and the commercially available, chromate-filled primer compositions to determine the effect of primer type and pretreatments on the strength and durability of the adhesive bond.

TABLE II

| Primer (25° C.)** | Pretreatment | Failure Mode | Aluminum Alloy | Lap Shear (p.s.i.) |
|---|---|---|---|---|
| Example 1 | Example 2 | Cohesive | 2024-T3 | 4200 ± 100 |
| Example 1 | Example 2 | Cohesive | 7075-T6 | 4500 ± 400 |
| Comparison* | Example 1 | Cohesive | 2024-T3 | 4500 ± 100 |

*Chromate-filled, modified epoxy phenolic primer applied by spray to a 0.1–0.5 mil film thickness, air dried at 25° C. for 30 min and oven cured at 250° C. for 30 min.
**Average of five specimens The above results show that the initial adhesive strength of bonds fabricated with primer compositions of the present invention is equivalent to that of bonds prepared with primer compositions of the prior art.

TABLE III

| Primer | Pretreatment | Aluminum Alloy | Crack Length (in)** (168 hours immersion) (25° C.) |
|---|---|---|---|
| Example 1 | Example 2 | 2024-T3 | 0.02 ± 0.02 |
| Comparison* | Example 1 | 2024-T3 | 0.01 ± 0.02 |

*Chromate-filled, modified epoxy phenolic primer applied by spray to a 0.1–0.5 mil film thickness, air dried at 25° C. for 30 min and oven cured at 250° C. for 30 min.
**Average of five specimens For the elevated temperature wedge tests, a 10 in diameter Pyrex crystallizing dish wrapped with heating tape served as the immersion vessel. The water was thermostatted using a solid state temperature controller and an Inconel sheathed, type K thermocouple. A polyethylene cover was fitted over the top of the dish to prevent excessive evaporation. The level was maintained by periodically adding deionized water so that the specimens were continuously immersed. The water temperature was kept within ±2° F. with this setup.

TABLE IV

| Primer | Pretreatment | Aluminum Alloy | Crack Length (in)** (168 hours immersion) (120° C.) |
|---|---|---|---|
| Example 1 | Example 2 | 2024-T3 | 0.12 ± 0.03 |
| Comparison* | Example 1 | 2024-T3 | 0.16 ± 0.03 |

*Chromate-filled, modified epoxy phenolic primer applied by spray to a 0.1–0.5 mil film thickness, air dried at 25° C. for 30 min and oven cured at 250° C. for 30 min.
**Average of four specimens The above results show that adhesive bonds fabricated using primer compositions of the present invention exhibit enhanced or equivalent durability under hydrothermal conditions to those primed with compositions of the prior art.

EXAMPLE 3

The following ingredients are blended together to form the primer composition at 10 percent solids content by weight:

| Parts by weight | |
|---|---|
| Silanol-terminated polydimethylsiloxane resin (having an average degree of polymerization between 50 and 60 and viscosity in the range of 90–110 centistokes) | 0.5 |
| Phosphate-modified bisphenol A polyepoxide resin (having an epoxide equivalent of 300 and a phosphorus content of from 0.5 to 2.5 percent by weight). | 8.0 |
| Amine-functional epoxy-amine adduct hardener (having a reactive hydrogen equivalent of 50 to 55). | 1.4 |
| Gamma-aminopropyltriethoxy silane | 0.1 |
| Dichloromethane | 90.0 |
| Total | 100.0 |

After the above ingredients are thoroughly blended together, the mixture is catalyzed by the addition of 1 percent by weight of titanium (IV) butoxide based on the weight of the polysiloxane resin. The catalyzed primer solution is stirred at room temperature to dissolve the primer before spraying over suitably prepared adherend surfaces. The composition is stable for 24 hours in the presence of solvent. When the solvent flashes off, the mixture will cure at room temperature.

TABLE V

| Primer | Pretreatment | Aluminum Alloy | Crack Length (in)** (168 hours immersion) (25° C.) |
|---|---|---|---|
| Example 3 | Example 2 | 2024-T3 | 0.03 ± 0.03 |
| Comparison* | Example 1 | 2024-T3 | 0.01 ± 0.02 |

*Chromate-filled, modified epoxy phenolic primer applied by spray to a 0.1–0.5 mil film thickness, air dried at 25° C. for 30 min and oven cured at 250° C. for 30 min.
**Average of four specimens

EXAMPLE 4

The following ingredients are blended together to form a precursor solution useful for forming primer compositions of the present invention.

| Ingredient: | Approximate parts by weight |
|---|---|
| Ethoxy-terminated polydimethylsiloxane resin having an average degree of polymerization of between 5 and 20 and viscosity between 20 and 100 centistokes | 0.5 |
| Bisphenol A polyepoxide resin having an epoxide equivalent weight of about 190 | 7.1 |
| Amine-functional epoxy-amine adduct hardner having a reactive hydrogen equivalent of about 50 | 2.0 |
| Gamma-aminopropyltriethoxy silane | 0.2 |
| Phosphoric acid (85% by weight) | 0.2 |
| 4-methyl-2-pentanone | 90.0 |
| TOTAL | 100.0 |

Primer compositions of the present invention are formed by first throughly blending said precursor solution to dissolve the components into the organic solvent and to allow the phosphoric acid to react with the Bisphenol A. Then said solution is mixed with about 1 percent by weight, based on the weight of the polysiloxane resin, of titanium(IV) butoxide.

This primer composition is stable for 24 hours. However, when sprayed over suitably prepared adherend surfaces, the organic solvent flashes off and the film-forming binder composition cures at room temperature in three hours.

TABLE VI

| Primer | Pretreatment | Aluminum | Crack Length** |
|---|---|---|---|
| Example 4 | Example 2 | 2024-T3 | 0.00 ± 0.00 |

TABLE VI-continued

| Primer | Pretreatment | Aluminum | Crack Length** |
|---|---|---|---|
| Comparison* | Example 1 | 2024-T3 | 0.01 ± 0.02 |

*Chromate-filled, modified epoxy phenolic primer applied by a spray to a 0.1–0.5 mil film thickness, air dried at 25° C. for 30 min and oven cured at 250° C. for 30 minutes.
**Average of four specimens.

Table VI illustrates that the adhesive bonds formed using primer compositions of the present invention exhibit equivalent or enhanced durability to bonds prepared with primer compositions of the prior art. Table VI also illustrates that primer compositions based on mixtures of bisphenol A polyepoxide resin and concentrated phosphoric acid give the same beneficial effect as the phosphate-modified bisphenol A polyepoxide resin of Examples 1, 2, and 3.

EXAMPLE 5

Coating compositions may according to this invention be formed by uniformly dispersing pigments into the primer. These pigments provide color to the film. They may also be used to provide the phosphorus needed to provide the phosphate ester of this invention.

Coating compositions containing about 5% to 30% by weight of film forming binder composition dissolved in an organic solvent are preferred for their ease of application by painting and spraying. By weight of this film forming binder, from about 1% to 50% may be pigment with about 2% to about 6% yielding optimum results.

By way of example but not by way of limitation, the following ingredients are blended together to form primer precursor solution. In this example, zinc phosphate is the source of phosphorus for the phosphate-modified polyepoxide of this invention.

| Ingredient | Approximate parts by weight |
|---|---|
| Ethoxy-terminated polydimethylsiloxane resin having an average degree of polymerization of between 5 and 20 and viscosity between 20 and 100 centistokes | 0.5 |
| Bisphenol A polyepoxide resin having an epoxide equivalent weight of about 190 | 7.1 |
| Amine-functional epoxy-amine adduct hardner having a reactive hydrogen equivalent of about 50 | 2.0 |
| Gamma-aminopropyltriethoxy silane | 0.2 |
| Zinc phosphate | 0.2 |
| Zinc molybdate | 0.2 |
| Fumed silica | 0.2 |
| 4-methyl-2-pentanone | 89.6 |
| TOTAL | 100.0 |

Primer compositions of the present invention are formed by first throughly blending said precursor solution to dissolve the components into the organic solvent and to allow the zinc phosphate to react with the Bisphenol A. Then said solution is mixed with about 1 percent by weight, based on the weight of the polysiloxane resin, of titanium(IV) butoxide.

This primer composition is stable for 24 hours. However, when sprayed over suitably prepared adherend surfaces, the organic solvent flashes off and the film-forming binder composition cures at room temperature in three hours.

TABLE VI

| Primer | Pretreatment | Aluminum | Crack Length** |
|---|---|---|---|
| Example 5 | Example 2 | 2024-T3 | 0.04 ± 0.05 |
| Comparison* | Example 1 | 2024-T3 | 0.01 ± 0.02 |

*Chromate-filled, modified epoxy phenolic primer applied by a spray to a 0.1–0.5 mil film thickness, air dried at 25° C. for 30 min and oven cured at 250° C. for 30 minutes.
**Average of five specimens.

Table VII illustrates that the adhesive bonds formed using primer compositions of the present invention exhibit equivalent durability to bonds prepared with primer compositions of the prior art. Table VII also illustrates that primer compositions based on mixtures of bisphenol A polyepoxide resin and phosphorus containing pigments give the same beneficial effect as the phosphate-modified bisphenol A polyepoxide resin of Examples 1, 2, and 3.

The above results show that the durability of adhesive bonds fabricated using primer compositions of the present invention is independent of the size of the polydiorganosiloxane resin employed.

The invention claimed is:

1. A primer composition comprising a diluent and a film-forming binder composition; said binder composition comprising an organometallic siloxane condensation catalyst, an amine hardner, a silane coupling agent, and a reaction product of:

(1) a reactive endgroup-functional polydiorganosiloxane represented by the general formula:

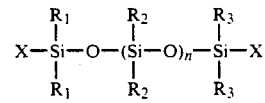

wherein n is an integer equal to 0 to 2,000 inclusive; X is selected from the group consisting of halogen, hydrogen, —OH, —OOCR$_3$, —OR$_3$, —O—N=R$_3$, —N(R$_3$)$_2$ and —SR$_3$; R$_1$ is selected from the group consisting of C$_{(1-3)}$ monovalent hydrocarbon radicals, substituted derivatives thereof which are free of olefinic unsaturation, and C$_{(2-10)}$ olefinically unsaturated aliphatic radicals; R$_2$ is selected from the group consisting of C$_{(1-18)}$ hydrocarbon radicals and substituted derivatives thereof; and R$_3$ is selected from the group consisting of a hydrocarbon radical and a substituted hydrocarbon radical; and (2) a phosphate ester containing terminal epoxide functionality corresponding to the general formula:

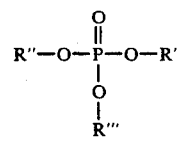

wherein R' is a glycidyl ether of the general formula:

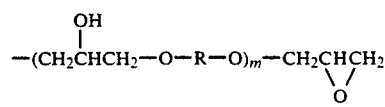

wherein m is a positive number between 0 and about 20 and equals the number of repeating units in said ether; R is an aromatic group or a remnant of a compound which contains an aromatic group; R'' is H or an organic group of up to about 20 carbons; and R''' is selected from a group consisting of R' and R''.

2. The primer composition of claim 1 wherein said silane coupling agent is selected from the group consisting of epoxycyclohexylalkyltrialkoxy silane, glycidoxyalkyltrialkoxy silane, mercaptoalkyltrialkoxy silane, aminoalkyltrialkoxy silane, and (aminoalkyl)aminoalkyltrialkoxy silane.

3. The primer composition of claim 1 wherein said film-forming binder composition comprises by weight from about 0.01% to about 20% of said endgroup-functional polydiorganosiloxane, from about 50% to about 95% of said phosphate ester, from about 0.01% to about 25% of said silane coupling agent, and from about 5% to about 30% of said amine hardner.

4. The primer composition of claim 1 wherein said diluent is an organic solvent which makes up about 70% to about 99% by weight of said primer composition.

5. The primer composition of claim 1 wherein said catalyst comprises about 0.1% to about 2.0% by weight of said polydiorganosiloxane and is selected from the group consisting of organotitanates, organozirconates, organotins, organozincs, and the carboxylic acid salts of iron.

6. The primer composition of claim 1 wherein said amine hardner is selected from the group consisting of aliphatic, aromatic, cycloaliphatic or epoxy-modified amines.

7. A coating composition comprising about 5% to 30% by weight, based on the weight of the coating composition, dissolved in an organic solvent and having pigments dispersed therein in a pigment to film forming binder composition weight ratio of 1:100 to 50:100; wherein the binder composition consists essentially of the binder composition of claim 1.

* * * * *